US011667815B2

(12) United States Patent
Hwang et al.

(10) Patent No.: US 11,667,815 B2
(45) Date of Patent: Jun. 6, 2023

(54) ADHESIVE FILM

(71) Applicant: 3M INNOVATIVE PROPERTIES COMPANY, St. Paul, MN (US)

(72) Inventors: Kyosung Hwang, Seoul (KR); Yongsuk Yang, Gyeonggi-do (KR); Ki-Sun Kim, Seoul (KR); Gyu Jin Jung, Gyepnggi-do (KR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/783,888

(22) PCT Filed: Dec. 8, 2020

(86) PCT No.: PCT/IB2020/061645
§ 371 (c)(1),
(2) Date: Jun. 9, 2022

(87) PCT Pub. No.: WO2021/116908
PCT Pub. Date: Jun. 17, 2021

(65) Prior Publication Data
US 2023/0036300 A1  Feb. 2, 2023

(30) Foreign Application Priority Data
Dec. 9, 2019 (KR) .................. 10-2019-0162668

(51) Int. Cl.
*C09J 7/29* (2018.01)
*C09J 183/04* (2006.01)

(52) U.S. Cl.
CPC .............. *C09J 7/29* (2018.01); *C09J 183/04* (2013.01); *C09J 2301/122* (2020.08); *C09J 2301/312* (2020.08); *C09J 2433/006* (2013.01); *C09J 2463/006* (2013.01); *C09J 2483/001* (2013.01); *C09J 2483/006* (2013.01); *Y10T 428/2809* (2015.01); *Y10T 428/2848* (2015.01)

(58) Field of Classification Search
None
See application file for complete search history.

(56) References Cited

U.S. PATENT DOCUMENTS

| | | | |
|---|---|---|---|
| 8,038,839 B2 * | 10/2011 | Noda | H01L 21/6836 156/930 |
| 8,181,688 B2 | 5/2012 | Johnson et al. | |
| 8,267,143 B2 | 9/2012 | George et al. | |
| 8,653,202 B2 | 2/2014 | Fujimaru et al. | |
| 8,764,026 B2 | 7/2014 | George et al. | |
| 8,919,412 B2 | 12/2014 | George et al. | |
| 2006/0029760 A1 | 2/2006 | Kreft et al. | |
| 2009/0115075 A1 | 5/2009 | Kessel et al. | |
| 2011/0073847 A1 | 3/2011 | Kobayashi et al. | |
| 2011/0129989 A1 * | 6/2011 | Urano | H01L 21/67051 438/459 |
| 2011/0300709 A1 | 12/2011 | Shintani | |
| 2015/0017434 A1 * | 1/2015 | Dronen | H01L 21/6835 156/247 |
| 2015/0060869 A1 | 3/2015 | Ro et al. | |
| 2015/0290960 A1 | 10/2015 | Kang | |

FOREIGN PATENT DOCUMENTS

| | | |
|---|---|---|
| JP | 2004176011 A | 6/2004 |
| JP | 2004179649 A | 6/2004 |
| JP | 2013185014 A | 9/2013 |
| JP | 2015220377 A | 12/2015 |
| KR | 20130007044 A | 1/2013 |
| KR | 20140147259 A | 12/2014 |
| WO | 2019045336 A1 | 3/2019 |

OTHER PUBLICATIONS

International Search Report for PCT Application No. PCT/IB2020/061645 dated Mar. 17, 2021, 4 pages.

* cited by examiner

*Primary Examiner* — Anish P Desai

(57) ABSTRACT

The present disclosure relates to an adhesive film, and adhesive film includes: a photothermal conversion layer including a light absorbing agent and a pyrolytic resin; an adhesive base film layer disposed on the photothermal conversion layer; a buffer layer disposed on the adhesive base film layer; and an adhesive layer disposed on the buffer layer, and the buffer layer includes a polysiloxane resin, and the adhesive layer includes a silicon-based adhesive, and the silicon-based adhesive includes a silicon-based tackifier and a polysiloxane resin. The adhesive film according to the present disclosure can simplify a process of processing a substrate, and can prevent a damage of the substrate and a circuit or an element formed on the substrate.

13 Claims, 1 Drawing Sheet

ADHESIVE FILM

CROSS REFERENCE TO RELATED APPLICATIONS

This application is a national stage filing under 35 U.S.C. 371 of PCT/IB2020/061645, filed 8 Dec. 2020, which claims the benefit of Korean Application No. 10-2019-0162668, filed 9 Dec. 2019, the disclosure of which is incorporated by reference in their entirety herein.

BACKGROUND

Technical Field

The present disclosure relates to an adhesive film, and more particularly, to an adhesive film which is disposed between a substrate to be processed and a supporter in a process of processing the substrate.

Background Art

In various fields, a thin-film type substrate or a substrate having flexibility is preferably used. In a process where such a thin-film type substrate is formed or a substrate having flexibility is used, a process of bonding the substrate to a hard supporter, and then separating the substrate from the hard supporter after processing of the substrate is completed has been suggested.

For example, in the field of quartz devices, it is preferable to reduce a thickness of a quartz wafer in order to increase an oscillation frequency. In particular, in the semiconductor industry, an effort to reduce a thickness of a semiconductor wafer to achieve high-density manufacturing by chip stacking technology and to reduce a thickness of a semiconductor package is ongoing.

Thickness reduction is performed by grinding a so-called back surface of a semiconductor wafer on the opposite surface of a surface including a pattern-formed circuit. To reduce thickness, a method of grinding a back surface of a wafer with the wafer being securely fixed to a hard supporter through an adhesive, transferring the wafer, and then separating the wafer from the hard supporter has been suggested. The wafer is supported by using the hard supporter, so that the wafer can be prevented from being destroyed during the grinding of the back surface and the transferring, and the wafer can be processed to have a thin thickness.

In another example, a flexible display device which can reinforce an aesthetic function and can give multiple functions when it is in use is developing, and in this case, it is preferable to use a flexible substrate. The flexible display device is expected as a next-generation display device substituting for a portable computer, an electronic newspaper, or a smart card, and a printing medium such as a book, a newspaper, a magazine, etc. As reinforcement of an aesthetic function, slimness, and lightness of such display devices are in progress, diversity of materials is required, and various flexible substrates are applied and used. For example, a thin-film metal sheet and plastic, etc. may be used for the flexible substrate.

However, it may be difficult to apply the flexible substrate to existing manufacturing equipment for display devices that is designed for glass or or quartz substrates, due to its characteristic of being easily bent, and for example, the flexible substrate has difficulty in being conveyed by track equipment or a robot or being received in a cassette.

Accordingly, the flexible substrate is bonded to a hard supporter before elements are formed, and the supporter supports the flexible substrate while elements are formed on the flexible substrate, and after the elements are formed on the substrate, the supporter is detached from the flexible substrate. To this end, there is provided a flexible display device which has elements stably formed therein even if a flexible substrate is used.

However, this process requires an additional process, such as a step of coating an adhesive between the substrate and the hard supporter, a step of curing the adhesive, etc., and there is a problem that the process is complicated and requires additional cost and time. Furthermore, in the process of separating the substrate from the hard supporter after processing the substrate, a wafer or the substrate itself may be destroyed, or a circuit of the wafer and an element of the flexible substrate may be destroyed.

SUMMARY

Technical Problem

An object of the present disclosure is to provide an adhesive film which can maintain high adhesion in the process of processing, and allows a substrate fixed onto a supporter to be easily detached from the supporter after the processing process. Accordingly, the present disclosure can prevent a substrate and elements or circuits formed on the substrate from being damaged and destroyed by a physical force when the substrate is separated from the supporter.

In addition, an object of the present disclosure is to provide an adhesive film which can stably support a processing target substrate having a protrusion such as a bump and can stably perform a substrate processing process, and can ensure processability.

In addition, an object of the present disclosure is to provide an adhesive film which has an excellent heat-resisting property and an excellent light-blocking effect, so that a processing target substrate and an element or a circuit formed on the substrate can be prevented from being damaged, and in particular, is usable in a process that requires a high-vacuum/high heat-resisting property of 250° C. or higher. More specifically, the present disclosure is applicable to a process that requires a temperature increase (Ramp-up) of a very high speed, or a process that excludes a temperature increase (Ramp-up) process and has a considerable thermal shock applied to a material by exposing the material to a high temperature in a single time In addition, still another object of the present disclosure is to provide an adhesive film which can simplify a process of fixing a substrate to be processed onto a supporter and detaching, so that a cost and a time can be saved.

In addition, an object of the present disclosure is to provide a process which performs processing with respect to a processing target substrate having a protrusion such as a bump, and then, removes an adhesive layer more stably. More specifically, an object of the present disclosure is to implement adhesive layer removal performance which can protect a material from a mechanical stress when the adhesive layer is removed, by implementing an appropriate peeling force, and can remove the adhesive layer without leaving residues of an adhesive on the material even after a high-temperature process.

Technical Solution

To solve the above-described problems of the related-art technology, an adhesive film of the present disclosure includes: a photothermal conversion layer including a light absorbing agent and a pyrolytic resin; an adhesive base film layer disposed on the photothermal conversion layer; a buffer layer disposed on the adhesive base film layer; and an adhesive layer disposed on the buffer layer, and the buffer layer includes a polysiloxane resin, the adhesive layer includes a silicon-based adhesive, and the silicon-based adhesive includes a silicon-based tackifier and a polysiloxane resin.

The silicon-based adhesive may include an additive curing type silicon-based resin.

The silicon-based tackifier may include an MQ resin.

The silicon-based adhesive may have a modulus of 10 MPa to 25 MPa at a room temperature after being cured.

The adhesive layer may have a thickness of 5 μm to 10 μm.

The polysiloxane resin of the buffer layer may include an additive curing type resin.

The polysiloxane resin of the buffer layer may include a siloxane resin having a C=C double bond.

The buffer layer may not include an MQ resin or may include an MQ resin by less than 5 weight %.

A thickness of the buffer layer may be greater than or equal to 50 μm.

The buffer layer may have a modulus of 10 MPa to 25 MPa at a room temperature after being cured.

The pyrolytic resin may have a —COOH or —OH functional group, and may include two kinds of acrylic resins having different weight average molecular weights.

The adhesive base film layer may have an adhesion with respect to both the buffer layer and the photothermal conversion layer.

The adhesive base film layer may include a multi-functional epoxy resin, a binder resin, a curing agent, and a curing catalyst.

Advantageous Effects

The adhesive film according to the present disclosure can maintain high adhesion in the process of processing, and allows a substrate fixed onto a supporter to be easily detached from the supporter after the processing process. Accordingly, the present disclosure can prevent a substrate and elements or circuits formed on the substrate from being damaged and destroyed by a physical force when the substrate is separated from the supporter.

In addition, the adhesive film according to the present disclosure can stably support a processing target substrate having a protrusion such as a bump, and can stably perform a substrate processing process, and can ensure processability.

In addition, the adhesive film according to the present disclosure has an excellent heat-resisting property and an excellent light-blocking effect, and in particular, is usable in a process that requires a high-vacuum/high heat-resisting property of 250° C. or higher. In addition, the adhesive film according to the present disclosure can simplify a process of fixing a substrate to be processed onto a supporter and detaching, so that a cost and a time can be saved.

DETAILED DESCRIPTION

Figure 1:
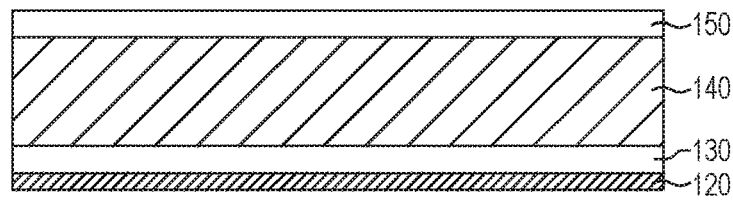
FIG. 1 is a cross-sectional view of an adhesive film according to the present disclosure.

Advantages and features of the present disclosure, and a method for achieving the same will be clarified by referring to embodiments described in detail below along with the accompanying drawings. However, the present disclosure is not limited to the exemplary embodiments set forth herein, and may be embodied in many different forms. Rather, the exemplary embodiments are provided so that the present disclosure will be thorough and complete, and will fully convey the scope of the present disclosure to those of ordinary skill in the art, and the present disclosure is defined by the scope of the claims.

Shapes, sizes, ratio, angles, numbers, etc. disclosed in the drawings to explain embodiments of the present disclosure are merely examples, and the present disclosure is not limited to matters illustrated in the drawings. The same reference numerals indicate the same components throughout the specification. Further, in the description of the present disclosure, certain detailed explanations of related-art technology are omitted when it is deemed that they may unnecessarily obscure the essence of the present disclosure.

When the terms "include", "have", etc. are used in the specification, other matters may be added in addition to described matters unless the expression "only" is used. When a component is expressed as singular form, any references to the singular form may include plural form unless expressly stated otherwise.

In interpreting a component, the component should be interpreted as including an error range even if it is not clearly indicated.

When a position relationship is described, for example, a position relationship between two portions such as "on", "on an upper portion", "on a lower portion", "beside", etc., one or more other portion may be positioned between the two portions unless "right" or "directly" is used.

Respective features of embodiments of the present disclosure may be coupled or combined in part or entirely, and various technical interlocking and operations are possible.

Hereinafter, embodiments of the present disclosure will be described in detail with reference to the drawings. Embodiments introduced hereinbelow are provided as examples, so that the present disclosure will fully convey the technical concept of the present disclosure to those of ordinary skill in the art. Accordingly, the present disclosure is not limited to the embodiments described hereinbelow and can be implemented in other forms.

FIG. 1 is a cross-sectional view of an adhesive film according to an embodiment of the present disclosure. Referring to FIG. 1, the adhesive film according to an embodiment of the present disclosure includes a photothermal conversion layer 120, an adhesive base film layer 130, a buffer layer 140, and an adhesive layer 150, which are stacked in sequence.

The adhesive film of the present disclosure is of a film type, and is formed by directly bonding the photothermal conversion layer 120 and the buffer layer 140 and the adhesive layer 150 to both surfaces of the adhesive base film layer 130 formed in the form of a film. That is, the adhesive film of the present disclosure has the adhesive base film layer 130 serving as a role of a support film, and is formed in a multi-layered structure without a hard base film such as a PI film, a PEN film. In a follow-up substrate processing process, the adhesive layer 150 is bonded to the substrate, and the photothermal conversion layer 120 is bonded to a hard supporter.

More specifically, the photothermal conversion layer 120 is divided when radiant energy such as a laser is projected, so that the substrate can be separated from the supporter without damaging the substrate or an element or a circuit on the substrate.

The photothermal conversion layer 120 includes a light absorbing agent and a pyrolytic resin. Radiant energy applied to the photothermal conversion layer 120 in the form of a laser is absorbed by the light absorbing agent, and is converted into thermal energy. The generated thermal energy abruptly increases a temperature of the photothermal conversion layer 120, and the temperature reaches a pyrolysis temperature of the pyrolytic resin (organic component) in the photothermal conversion layer 120, causing pyrolysis of the resin. A gas generated by the pyrolysis forms an opening layer (such as a space) in the photothermal conversion layer 120, and divides the photothermal conversion layer 120 into two portions, and accordingly, the supporter and the substrate are separated.

The light absorbing agent may absorb radiant energy and may convert the radiant energy into thermal energy. In addition, the light absorbing agent functions to block light and can prevent the substrate from being damaged by a laser, etc.

Although the light absorbing agent changes dependently on a wavelength of the laser, examples of a usable light absorbing agent include carbon black, graphite powder, ultra-fine metal powder such as iron, aluminum, copper, nickel, cobalt, manganese, chrome, zinc, and tellurium, metallic oxide powder such as black titanium oxide, and dye and pigment such as aromatic diamino-based metal complex, aliphatic diamine-based metal complex, aromatic dithiol-base metal complex, mercaptophenol-based metal complex, squarylium-based compound, acyanine-based dye, methine-based dye, naphthoquinone-based dye and anthraquinone-based dye. The light absorbing agent may be in the form of a film including a vapor-deposited metal film.

From among the light absorbing agents, carbon black is in particular useful since carbon black noticeably reduces a force necessary for separating the substrate from the supporter after projection, and accelerates separation.

A particle size of the light absorbing agent in the photothermal conversion layer 120 may be about 20 nm to about 2000 nm, preferably, may be about 50 nm to about 1000 nm, and more preferably, may be about 100 nm to about 350 nm.

If the particle size of the light absorbing agent is less than about 20 nm, it may be difficult to disperse, and a large amount of light absorbing agent may not be loaded because a surface area increases as a particle size is smaller, and there is a limit to a loading content. In addition, if the particle size of the light absorbing agent exceeds about 2000 nm, laser blocking performance may be reduced, and performance of dividing the photothermal conversion layer 120 by a laser may be reduced. In addition, as a particle size of the light absorbing agent increases, a film forming ability may be reduced, and dispersion stability after dispersion may be reduced, and time required to make a production liquid and to coat should be short.

A content of the light absorbing agent in the photothermal conversion layer 120 may be about 5 weight % to about 80 weight % with reference to a total weight of the photothermal conversion layer 120, preferably, may be about 10 weight % to about 60 weight %, and more preferably, may be about 20 weight % to about 50 weight %.

If the content of the light absorbing agent is less than about 5 weight %, it is difficult to separate by a laser. In addition, if the content of the light absorbing agent exceeds about 80 weight %, a portion of the photothermal conversion layer 120, separated by the laser, remains on the surface of the adhesive base film layer 130 after the photothermal conversion layer 120 is separated by the laser, and in this case, adhesion is greatly reduced due to a high carbon content.

In this case, there is a problem that, in a process of removing the adhesive base film layer 130 and the adhesive layer 150 by a removal tape, it is difficult to remove the adhesive base film layer 130 since the adhesive base film layer 130 is not well attached to the removal tape. In addition, as the content of the light absorbing agent increases, adhesion of the surface of the photothermal conversion layer 120 becomes lower and it is difficult to laminate on the supporter and dispersion of the light absorbing agent is not uniform.

The pyrolytic resin in the photothermal conversion layer 120 includes an acrylic resin. Preferably, the acrylic resin includes a monomer selected from the group consisting of methyl methacrylate (MMA), hydroxyethyl methacrylate (HEMA), ethyl acrylate (EA), butyl acrylate (BA), acrylonitrile (AN), and a combination thereof. Preferably, the monomer may be selected from a combination of three or more of methyl methacrylate (MMA), hydroxyethyl methacrylate (HEMA), ethyl acrylate (EA), butyl acrylate (BA), and acrylonitrile (AN). Such an acrylic resin may have an appropriate molecular weight, Tg, a heat-resisting property, and a functional group.

A content of the acrylic resin may be about 5 weight % to about 80 weight % with reference to a total weight of the photothermal conversion layer 120, preferably, may be about 15 weight % to about 60 weight %, and more preferably, may be about 40 weight % to about 60 weight %. If the content of the acrylic resin is less than about 5 weight %, a film forming ability is reduced and it is difficult to adjust a thickness of the photothermal conversion layer 120, and it is difficult to laminate on the supporter since adhesion of the surface of the photothermal conversion layer 120 is very low. In addition, if the content of the acrylic resin exceeds about 80 weight %, a great physical force is required when the photothermal conversion layer 120 is divided after laser projection, and it may be difficult to separate the substrate and the supporter, and the substrate and an element or a circuit formed on the substrate may be damaged.

The acrylic resin preferably includes two kinds of acrylic resins having different weight average molecular weights, and more preferably, includes a high molecular weight acrylic resin and a low molecular weight acrylic resin. The high molecular weight acrylic resin makes the photothermal conversion layer 120 have an excellent heat resisting property, and the low molecular weight acrylic resin enhances adhesion of the photothermal conversion layer 120 and is advantageous in making a film.

In this case, a glass transition temperature (Tg) of the high molecular weight acrylic resin may be 0° C. to 10° C., and a Tg of the low molecular weight acrylic resin may be −10° C. to 0° C. If the Tg of the high molecular weight acrylic resin is higher than 10° C. and the Tg of the low molecular weight acrylic resin is higher than 0° C., the heat resisting property of the photothermal conversion layer 120 may be enhanced, but adhesion of the surface may be reduced. On the other hand, if the Tg of the high molecular weight acrylic resin is lower than 0° C. and the Tg of the low molecular weight acrylic resin is lower than−10° C., bonding performance may be enhanced, but the heat resisting property may be reduced.

A weight average molecular weight of the high molecular weight acrylic resin may be about 400,000 g/mol to about 15,000,000 g/mol, preferably, may be about 500,000 g/mol to about 1,200,000 g/mol, and more preferably, may be about 700,000 g/mol to about 1,000,000 g/mol. If the weight average molecular weight of the high molecular weight acrylic resin is smaller than about 400,000 g/mol, the heat resisting property of the photothermal conversion layer 120 may be reduced, and, if the weight average molecular weight of the high molecular weight acrylic resin is larger than about 15,000,000 g/mol, it is not easy to coat and mix a production liquid of the photothermal conversion layer 120.

A weight average molecular weight of the low molecular weight acrylic resin may be about 50,000 g/mol to about 600,000 g/mol, preferably, may be about 100,000 g/mol to about 500,000 g/mol, and more preferably, may be about 400,000 g/mol to about 500,000 g/mol. If the weight average molecular weight of the low molecular weight acrylic resin is smaller than about 50,000 g/mol, the heat resisting property of the photothermal conversion layer 120 is reduced, and, if the weight average molecular weight of the low molecular weight acrylic resin is larger than about 600,000 g/mol, lamination performance of the photothermal conversion layer 120 is reduced.

A weight ratio of the low molecular weight acrylic resin: the high molecular weight acrylic resin may be about 1:4 to about 4:1, preferably, may be about 1:3 to about 3:1, and more preferably, may be about 1:2 to about 2:1. If a content of the low molecular weight acrylic resin is greatly smaller than a content of the high molecular weight acrylic resin, lamination performance of the photothermal conversion layer 120 is reduced. In addition, if the content of the high molecular weight acrylic resin is greatly smaller than the content of the low molecular weight acrylic resin, the heat resisting property of the photothermal conversion layer 120 is reduced, and adhesion on the divided surface of the photothermal conversion layer 120 after laser projection is strong, and accordingly, a physically large force is required to separate.

The pyrolytic resin has a —COOH or —OH functional group. Preferably, the pyrolytic resin includes an acrylic resin having the —COOH or —OH functional group. The photothermal conversion layer 120 including the pyrolytic resin having the —COOH or —OH functional group is not a pressure-sensitive adhesive type. The photothermal conversion layer 120 has the —COOH or —OH functional group, such that the photothermal conversion layer 120 can be bonded with the supporter by hydrogen bonding, and, for example, may be hydrogen-bonded with a silanol group on a glass surface of the supporter formed with glass. In this case, the hydrogen bonding provides initial adhesion to bond the adhesive layer to the supporter, and stickiness between the photothermal conversion layer 120 and the supporter may greatly increase due to heat generated in a process after the bonding process.

The —COOH or —OH functional group may have an acid value greater than or equal to about 1 mgKOH/g, preferably, greater than or equal to about 5 mgKOH/g. The lamination performance of the photothermal conversion layer 120 is based on the —COOH or —OH functional group, and, if the acid value of the —COOH or —OH functional group is lower than about 1 mgKOH/g, the lamination performance is reduced. An upper limit of the acid value of the —COOH or —OH does not bring about a problem. However, due to a chemical structure, the acid value may preferably have about 1 mgKOH/g to about 50 mgKOH/g, more preferably, about 1 mgKOH/g to about 30 mgKOH/g, and most preferably, about 10 mgKOH/g to about 20 mgKOH/g.

The photothermal conversion layer 120 may further include an inorganic filler. The inorganic filler functions to prevent the photothermal conversion layer 120 from being re-bonded after the photothermal conversion layer 120 is divided due to the opening layer formed as a result of pyrolysis of the pyrolytic resin. Accordingly, when the photothermal conversion layer 120 is separated by projecting a laser after the substrate is processed, a physical force required to separate the substrate and the supporter may be additionally reduced.

The inorganic filler may be selected from the group consisting of $SiO_2$, $Al_2O_3$, $TiO_2$ and a combination thereof. In particular, in the case of $TiO_2$, there is an additional light blocking effect on the substrate.

A particle size of the inorganic filler in the photothermal conversion layer 120 may be about 20 nm to about 2000 nm, preferably, may be about 50 nm to about 1000 nm, and more preferably, may be about 100 nm to about 350 nm. If the particle size of the inorganic filler is less than about 20 nm, it is not easy to disperse the inorganic filler when the film is made, and there is a limit to an amount to be loaded. In addition, if the particle size of the inorganic filler exceeds about 2000 nm, the film forming ability is reduced and dispersion persistence after dispersion is reduced.

A content of the inorganic filler in the photothermal conversion layer 120 may be about 4 weight % to about 60 weight % with reference to a total weight of the photothermal conversion layer 120, preferably, may be about 5 weight % to about 50 weight %, and more preferably, may be about 5 weight % to about 30 weight %. If the content of the inorganic filler is less than about 4 weight %, adhesion on the surface separated after the separation process by laser projection is strong, and the photothermal conversion layer 120 may be re-bonded as time is elapsed. In addition, if the content of the inorganic filler exceeds about 60 weight %, the adhesion of the photothermal conversion layer 120 is very low and it is difficult to laminate on the supporter, and the film forming ability is reduced and dispersion is not uniform.

The photothermal conversion layer 120 may further include a dispersing agent. A content of the dispersing agent may be about 0.1 weight % to about 10 weight % with reference to a total weight of the photothermal conversion layer 120, preferably, may be about 0.1 weight % to about 7 weight %, and more preferably, may be about 0.1 weight % to about 5 weight %. If the content of the dispersing agent is less than about 0.1 weight %, dispersion of the light absorbing agent and the inorganic filler in the photothermal conversion layer 120 may be reduced, and dispersion persistence after dispersion may also be reduced. In addition, if the content of the dispersing agent exceeds about 10 weight %, the heat resisting property of the photothermal conversion layer 120 may be reduced, and added additives may be decomposed at a high temperature, and a loss in weight may increase.

A thickness of the photothermal conversion layer 120 may be about 1 μm to about 30 μm, preferably, may be about 3 μm to about 20 μm, and more preferably, may be about 5 μm to about 15 μm. If the thickness of the photothermal conversion layer 120 is less than about 1 μm, the upper adhesive layer may directly influence a material, and laser blocking performance by the light-absorbing agent may be reduced. In addition, if the thickness of the photothermal conversion layer 130 exceeds about 30 μm, many adhesive residues may remain on the supporter after laser projection.

The photothermal conversion layer 120 may be formed on the adhesive base film layer 130 in the form of a film. When the photothermal conversion layer 120 is formed by being directly coated on the supporter in a liquid form, if a viscosity is low, a thickness of less than about 1 μm may be formed, and a sufficiently thick thickness is not guaranteed. To this end, it is difficult to use the light absorbing agent enough to block a laser, and it is difficult to prevent a damage to the substrate by the laser.

According to the present disclosure, the photothermal conversion layer 120 may be formed by being directly coated on the supporter in a liquid form, and may be formed in the form of a film through separate coating and then may be laminated with the adhesive base film layer 130 through a thermal lamination process When the photothermal conversion layer 120 according to the present disclosure is formed in the form of a film, it is easy to adjust a thickness thereof, and the photothermal conversion layer 120 has the advantage of protecting the substrate and the circuit or element formed thereon. In addition, the photothermal conversion layer 120 may have adhesion of 150 gf/25 mm to 1600 gf/25 mm with respect to the supporter.

On the other hand, the adhesive layer 150 is used to fix the substrate. After the substrate and the supporter are separated from each other by decomposition of the photothermal conversion layer 120, the substrate having the adhesive layer 150 formed thereon is obtained. Accordingly, the adhesive layer 150 should be easily separated from the substrate by delamination, etc. The adhesive layer 150 is a film type layer which is formed on the adhesive base film layer 140 and the buffer layer 140, and is not a photo-curable adhesive that is directly coated on the substrate.

The adhesive layer 150 is a silicon-based adhesive layer, and may include a silicon-based adhesive. The silicon-based adhesive may include a silicon-based tackifier and a polysiloxane resin Preferably, the silicon-based adhesive may include an additive curing type silicon-based resin. More preferably, the silicon-based adhesive may include an additive curing type silicon-based adhesive which is formed of a silicon resin having a vinyl (C=C) group for curing by Si—H.

When the additive curing type silicon-based resin is included, it is easy to shield a protrusion of the substrate such as a bump since an initial modulus is sufficiently low compared to a radical curing type adhesive implemented to show adhesion of the same level. When a radical curing type silicon-based adhesive is included, higher pressure and temperature are required, and a larger thickness is required.

In addition, when the radical curing type silicon-based adhesive is included, a higher modulus is shown and residues may be left due to high adhesion, and a void may be generated since a degree of cure of the polysiloxane resin becomes lower, and, if a size of the protrusion is large and a gap is dense, a void may be generated.

In addition, when the buffer layer 140 is formed with an additive curing type resin and the adhesive layer 150 includes the additive curing type silicon-based resin, compatibility of the buffer layer 140 and the adhesive layer 150 may be enhanced.

The silicon-based tackifier may include an MQ resin. Preferably, the silicon-based tackifier may include the MQ resin by about 10 weight % to about 50 weight %, preferably, by about 20 weight % to about 40 weight %, and more preferably, by about 30 weight % to about 40 weight %.

The MQ resin refers to a silicon compound that has a three-dimensional network-like stereoscopic molecular structure including a mono functional siloxane unit (hereinafter, "M unit"), and a tetrafunctional siloxane unit (hereinafter, "Q unit"). In addition, the MQ resin may additionally include other difunctional siloxane unit (hereinafter, "D unit") or a trifunctional siloxane unit (hereinafter, "T unit").

In general, the M unit refers to a unit expressed by $R_3SiO_{1/2}$, the Q unit refers to a unit expressed by $SiO_{4/2}$, the D unit refers to a unit expressed by $R_2SiO_{2/2}$, and the T unit refers to a unit expressed by $RSiO_{3/2}$. R refers to a functional group that is coupled to silicon (Si), and preferably, R may be an alkyl group or aryl group.

If the MQ resin is less than about 10 weight %, adhesion is low and there may be a problem of delamination, and, if the MQ resin is included by about 50% weight or more, the MQ resin may cause high adhesion and there may be a problem that the substrate processed in a follow-up adhesive layer removing process is destroyed or residues remain.

In a substrate processing process, in particular, in a semiconductor process, an adhesive film guaranteeing excellent stability in a high-temperature and high-vacuum condition is required. However, in the case of an acrylic adhesive, the critical point of temperature for the heat-resisting property is 200° C., and, if the process proceeds at a higher temperature or continues for a long time, the adhesive may melt down.

In addition, since the acrylic adhesive, etc. has a high CTE, but has a low modulus and is flexible, there may be a reaction to deformation of a material at a high temperature. Accordingly, the acrylic adhesive has a poor heat-resisting property to be used in a high-temperature/high-vacuum process, and has a problem of reduced adhesion in a high-temperature condition.

On the other hand, a silicon-based adhesive has excellent stability at a high temperature, and has an excellent heat-resisting property. In addition, the silicon-based adhesive may be softer than adhesives of other materials, for example, an acrylic adhesive, so that excellent lamination performance can be achieved when the silicon-based adhesive bonds a rigid material such as the substrate and the supporter.

Furthermore, softness of the silicon-based adhesive enables the adhesive layer 150 to be smoothly removed when the adhesive layer 150 is detached after a substrate processing process is finished, and can prevent a damage to an element on the substrate. In addition, after the substrate processing process is finished, when the adhesive layer 150 is detached, a high temperature may be used, and accordingly, there may be no residue on the substrate.

The polysiloxane resin of the adhesive layer 150 may be a polysiloxane elastomer. The polysiloxane resin performs the role of reducing adhesion of the silicon-based adhesive. If only the silicon-based adhesive is used without the polysiloxane resin, adhesion of the adhesive is high, tackiness is high, and the modulus is low, and thus, a void may be generated.

The polysiloxane resin may have a C=C double bond. Preferably, the polysiloxane resin may have a C=C double bond having a high reactivity at an end. The adhesive layer 150 may additionally include an additive. The additive may be a catalyst or a curing agent. The polysiloxane resin of the adhesive layer 150 may have a double bond and may be cured by Si—H in the presence of a platinum (Pt) catalyst. In this case, the silicon-based adhesive may be a resin that is cured by a platinum catalyst reaction.

The adhesive layer 150 may have a modulus of about 10 MPa-about 25 MPa inclusive at a room temperature after being cured. If the adhesive layer 150 has a modulus of less than 10 MPa at a room temperature, the resin may come out from the processing target substrate in a high-temperature and high-vacuum process, and, if the modulus exceeds 25 MPa, it is not easy to shield the protrusion and embeddability may be reduced. A thickness of the adhesive layer 150 may be about 5 μm to about 10 μm, preferably, may be about 5 μm to about 8 μm, and more preferably, may be about 6 μm to about 8 μm. If the thickness of the adhesive layer 150 is less than about 5 μm, delamination may occur due to low adhesion when a device is excessively distorted, and it may not be easy to manage manufacturing of products. In addition, if the thickness of the adhesive layer 150 exceeds about 10 μm, an area contacting the protrusion of the substrate increases when the adhesive layer 150 is formed, and residues may be generated in an adhesive layer removing process, and there may be problems that the substrate is destroyed and the effect of the buffer layer is reduced.

A post-curing process for curing by thermal aging or UV projection after an adhesive based on acryl or rubber and having a low initial modulus is placed in position on a substrate having a protrusion has been researched. However, the present disclosure cannot use the post-curing method by UV projection due to the use of the photothermal conversion layer 120. In addition, the silicon-based adhesive applied for a high-temperature process may make it impossible to implement the post-curing process by thermal energy.

Accordingly, by using the adhesive layer 150 having an appropriate modulus and adhesion, the present disclosure provides an adhesive film that can achieve excellent embeddability with respect to a substrate having a protrusion, does not leave residues, and has excellent processability.

The buffer layer 140 is disposed between the adhesive layer 150 and the adhesive base film layer 130. The buffer layer 140 may perform the role of a buffer for surrounding a protrusion such as a bumper on on the processing target substrate. Accordingly, even if the processing target substrate includes a protrusion, the processing target substrate can be stably supported by the adhesive film during a substrate processing process.

The buffer layer 140 may include a polysiloxane resin. The polysiloxane resin may be a polysiloxane elastomer. The buffer layer 140 including the polysiloxane resin may have very low adhesion, or may not have adhesion. The polysiloxane resin may have a C=C double bond. Preferably, the polysiloxane resin may have a C=C double bond having a high reactivity at an end. More preferably, the polysiloxane resin may include a siloxane resin having a C=C double bond, that is, a C—C functionality (vinyl functionality), by about 10 weight % or more. If the siloxane resin having the C=C functionality (vinyl functionality) is included by less than about 10 weight %, the heat-resisting property of the buffer layer may be reduced due to a low degree of cure.

The polysiloxane resin may include an additive curing type resin which is cured by Si—H. The polysiloxane resin has a double bond and may be cured by Si—H in the presence of a platinum catalyst. In the case of a radical curing type, that is, a condensation reactive resin, which is cured by radical, a portion of the radical may react with an epoxy material, and a portion of a resin on an interface portion of an epoxy layer and a silicon adhesive layer may not be cured. In addition, this may cause residues due to the lack of a heat-resisting property and the lack of a modulus/cohesiveness.

The buffer layer 140 may not include an MQ resin or may include the MQ resin by 5 weight % or less. If the MQ resin is included by more than 5 weight %, the MQ resin may cause high adhesion, and there may be a problem that the substrate processed in the follow-up adhesive layer removing process is destroyed or residues remain.

Since the polysiloxane resin of the buffer layer 140 has no tackiness due to a siloxane molecular structure of a high molecular weight, but shows a high heat-resisting property, the buffer layer 140 may be separated without leaving residues on a surface of the protrusion of the substrate.

The buffer layer 140 may have a thickness larger than the adhesive layer 150. When the buffer layer 140 has the thickness larger than the adhesive layer 150, excellent embeddability is achieved with respect to the processing target substrate having the protrusion such as a bump. Preferably, a sum of the thicknesses of the buffer layer 140 and the thickness of the adhesive layer 150 may be three times larger than a size of the protrusion of the processing target substrate.

Considering lamination performance and embeddability of the protrusion by considering a height of the protrusion such as a bump disposed on the substrate, the thickness of the buffer layer 140 may be about 50 μm or more. An upper limit of the thickness of the buffer layer 140 does not matter, but preferably, the thickness of the buffer layer 140 may be about 50 μm to about 80 μm, preferably, may be about 60 μm to about 80 μm, and more preferably, may be about 70 μm to about 80 μm. Preferably, the thickness of the buffer layer 140 may vary according to a height of the protrusion of the substrate.

If the thickness of the buffer layer 140 is less than about 50 μm, it may be difficult to sufficiently surround the protrusion of the substrate, and it may be difficult to stably support the substrate. In addition, if the thickness of the buffer layer 140 exceeds about 80 μm, it may be difficult to form the buffer layer by a single time coating, and, if the thickness of the buffer layer 140 is very thick in comparison to the height of the protrusion, it may be difficult to fix in the substrate processing process due to softness of the buffer layer 140.

If the buffer layer 140 includes a polysiloxane elastomer which is a silicon-based material, it is difficult to directly coat between silicon and an acrylic material since the photothermal conversion layer 120 includes an acrylic component. Specifically, the photothermal conversion layer 120 cannot be coated on the buffer layer 150 due to low surface energy of the silicon-based adhesive. To the contrary, the buffer layer 140 cannot be coated on the photothermal conversion layer 120.

In addition, the buffer layer 140 may have a modulus of about 10 MPa to about 25 MPa at a room temperature after being cured. If the buffer layer 140 has a modulus of less than about 10 MPa at a room temperature, the resin may come out from the processing target substrate in a high-temperature and high-vacuum process, and to the contrary, if the modulus exceeds 25 MPa, it is not easy to shield the protrusion and embeddability may be reduced.

In addition, a support film layer may be required to support the photothermal conversion layer 120, the buffer layer 140, and the adhesive layer 150.

To support the photothermal conversion layer 120, the buffer layer 140, and the adhesive layer 150, a solid film, for example, a PI film, has been invented. However, in the case of the PI film, the PI film may have high rigidity and a high modulus, but in general, indicates a larger CTE than that of a substrate such as a supporter or a wafer. Accordingly, in the case of the PI film, wrinkles, distortion, warping may occur at a high temperature. An uneven surface may influence substrate processing due to the wrinkles, distortion, warping of the PI film, and may cause a processing faulty.

In addition, if a rigid base film like the PI film is used, there is a problem that silicon primer processing should be performed on the PI film. Accordingly, there are problems that the number of processes increases and a cost and a time increase.

In addition, an additional adhesive layer is required to bond the PI film to the photothermal conversion layer 120, and accordingly, the overall thickness of the film increases and the structure becomes complicated.

To solve these problems, the present disclosure has the adhesive base film layer 130 formed between the photothermal conversion layer 120 and the buffer layer 140. The adhesive base film layer 130 has adhesion with respect to both the photothermal conversion layer 120 and the buffer layer 140.

That is, the adhesive base film layer 130 of the present disclosure can reduce or prevent the problems caused by a rigid base film. Specifically, thanks to a low modulus compared to the PI film, the adhesive base film layer 130 can prevent problems of wrinkles, distortion, warping, etc., which are caused by expansion or contraction involved in thermal behavior of a material or a supporter.

Furthermore, when the adhesive base film layer 130 is used instead of a rigid film, all of the photothermal conversion layer 120, the adhesive base film layer 130, the buffer layer 140, and the adhesive layer 150 constitute the adhesive film with soft layers of adhesive materials, and accordingly, the adhesive film itself may have softness, and is more advantageous to lamination with the supporter and the substrate, and shows high adhesion.

The adhesive base film layer 130 includes an epoxy resin. Preferably, the adhesive base film layer 130 includes a multi-functional epoxy resin. More preferably, the multi-functional epoxy resin may be a novolac epoxy resin or a dicyclopentadiene epoxy resin. The multi-functional epoxy resin may increase a chemical resistance by implementing a high crosslink density.

Such an adhesive base film layer 130 has a chemical resistance with respect to all of a solvent used in the photothermal conversion layer 120, for example, methyl ethyl ketone (MEK) and ethyl acrylate (EA), and a solvent used in the adhesive layer 150, for example, toluene and xylene.

In addition, the adhesive base film layer 130 may not expand or contract between the photothermal conversion layer 120 and the buffer layer 140 even at a high temperature. In particular, the adhesive base film layer 130 maintains a physical rigidity without contraction or expansion even at a curing temperature of the silicon-based adhesive layer 150.

Furthermore, the adhesive base film layer 130 has a CTE and a modulus appropriate to a process, and does not show a physical change in a follow-up substrate processing process.

In addition, the adhesive base film layer 130 including the epoxy resin has adhesion with both the photothermal conversion layer 120 and the adhesive layer 150, which are not bonded to each other, and has a degree of cure enough to support the two layers.

In addition, since the adhesive base film layer 130 has its own adhesive, and a process of forming separate film layers and laminating is not performed, and the photothermal conversion layer 120 and the buffer layer 140 are directly coated on the adhesive base film layer 130 in the manufacturing process, interlayer adhesion between the adhesive base film layer 130 and the photothermal conversion layer 120, and between the adhesive base film layer 130 and the buffer layer 140 is very high. Accordingly, an excellent heat-resisting property can be guaranteed and stability of the process is excellent even in a high-temperature, high-vacuum process.

In addition, the adhesive base film layer 130 includes a binder resin. The binder resin enables a layer including an epoxy resin to be filmed.

The binder resin may be an elastomer resin. Preferably, a glass transition temperature Tg of the binder resin may be at least 0 degree. The binder resin having such a glass transition temperature may make the adhesive base film layer 130 have an excellent heat-resisting property.

The binder resin may be an elastomer resin based on acryl or rubber. The binder resin may include a robber-based or acrylic polymer. For example, the binder resin may include nitride butadine rubber (NBR) or styrene butadiene rubber (SBR).

Preferably, if the binder resin includes NBR, the binder resin may include an acrylonitrile group of 30 weight % or more with reference to the total weight of the binder resin. In this case, the binder resin may be easily dissolved in a solvent.

Preferably, if the binder resin includes the acrylic polymer, the acrylic polymer may include two or more or three or more monomers selected from the group consisting of ethyl acrylate (EA), hydroxyethyl methacrylate (HEMA), hydroxyethyl acrylate (HEA), butyl acrylate (BA), poly (methyl methacrylate) (PMMA), acrylonitrile (AN), and a combination thereof.

The binder resin has a weight average molecular weight (Mw) of about 500,000 to about 1,500,000, preferably, has a weight average molecular weight (Mw) of about 700,000 to about 1,000,000, and more preferably, has a weight average molecular weight (Mw) of 800,000 to about 1,000,000. The binder resin of a high molecular weight makes the adhesive base film layer 130 have a heat-resisting property.

If the weight average molecular weight of the binder resin is less than about 500,000, a chemical resistance and a heat-resisting property of the adhesive base film layer 130 may be inadequate. In addition, if the weight average molecular weight of the binder resin exceeds about 1,500,000, there is a problem that it is difficult to film the adhesive base film layer 130, and it is difficult to apply since the binder resin is not well dissolved in a solvent.

In addition, the binder resin may have an epoxy group in its chain. The binder resin has the epoxy group in its chain, so that compatibility of the epoxy resin and the binder resin can be enhanced.

In this case, preferably, a weight ratio of the epoxy resin: binder resin of the adhesive base film layer may be 25:75 to 55:45. That is, based on 100 parts by weight of the total weight of the epoxy resin and the binder resin, the epoxy resin is 30-60 parts by weight, and the binder resin is 40-70 parts by weight. Preferably, the weight ratio of the epoxy resin: binder resin of the adhesive base film layer is 30:70 to 50:50, and more preferably, may be 40:60.

If the epoxy resin is used by less than 30 parts by weight per 100 parts by weight of the total weight of the epoxy resin and the binder resin, the chemical resistance is reduced and rigidity of the adhesive resin film layer is insufficient, and thus, it may be difficult to coat the photothermal conversion layer and the adhesive layer in a follow-up process. In addition, if the epoxy resin is larger than 60 parts by weight, the chemical resistance and the rigidity may be excellent, but the adhesive base film layer may be brittle and may be difficult to use as a support film layer.

In addition, the adhesive base film layer 130 including the epoxy resin has adhesion with both the photothermal conversion layer 120 and the buffer layer 140, which are not bonded to each other, and has a degree of cure enough to support the two layers.

The adhesive base film layer 130 may include a curing agent. Preferably, the adhesive base film layer 130 may include a phenol curing agent. In general, amine and isocyanate may be considered as a curing agent for the epoxy resin, but such curing agents have difficulty in filming. The adhesive base film layer 130 uses the phenol curing agent as a curing agent, so that filing can be achieved while appropriately controlling a curing speed.

The adhesive base film layer 130 may include a curing catalyst. Such a curing catalyst is used as much as an amount so that the adhesive base film layer 130 has a chemical resistance with respect to methyl ethyl ketone (MEK), ethyl acrylate (EA), toluene and xylene, and can maintain a heat-resisting property. For example, the curing catalyst may be imidazol.

In addition, the adhesive base film layer 130 may additionally include a filler. For example, the filler may include one or more selected from the group consisting of $TiO_2$, silica, copper powder, alumina, and carbon black.

The filler can additionally prevent contraction and expansion of the adhesive base film layer 130. In addition, there is an additional light-blocking effect for the substrate when light is projected onto the photothermal conversion layer 120 after the substrate processing process is finished.

The adhesive base film layer 130 may go through aging of a predetermined duration after being manufactured. For example, the adhesive base film layer 130 may go through aging of about four days. Accordingly, the reaction of the epoxy is completely terminated, and stability can be enhanced when the photothermal conversion layer 120 and the buffer layer 140 are formed on the adhesive base film layer 130 in a follow-up process, or in the substrate processing process.

A thickness of the adhesive base film layer 130 may be about 5 μm to about 50 μm, preferably, may be about 10 μm to about 40 μm, and more preferably, may be about 15 μm to about 30 μm. If the thickness of the adhesive base film layer 130 is less than about 5 μm, it may be difficult to have physically sufficient rigidity, and it may be difficult to support the photothermal conversion layer 120, the buffer layer 140, and the adhesive layer 150, and the adhesive base film layer 130 may be influenced by contraction occurring when the adhesive layer is cured. In addition, if the thickness of the adhesive base film layer 130 exceeds about 50 μm, a solvent may be difficult to evaporate during a coating process, and irregular holes may be generated on a surface of the film, and, if the solvent remains, the solvent may influence a material property of the adhesive film.

Although not shown in the drawings, a liner may be disposed on each of exposed surfaces of the photothermal conversion layer 120 and the adhesive layer 150. Such a liner performs the role of supporting and protecting the adhesive film. The liner is removed when the adhesive film is used.

The liner may be silicon-coated polyethylene terephthalate (PET), but is not limited thereto, and any material to support and protect the adhesive film can be used.

A manufacturing process of the adhesive film according to an embodiment of the present disclosure will be described hereinbelow.

The adhesive base film layer 130 is formed on a first liner. Thereafter, the buffer layer 140 is formed on the adhesive base film layer 130, the adhesive layer 150 is formed on the buffer layer 140, and a second liner may be laminated on the adhesive layer 150.

Separately, the photothermal conversion layer 120 may be formed on a third liner, and a fourth liner may be laminated on the photothermal conversion layer 120. Next, the photothermal conversion layer 120 and the adhesive base film layer 130 are laminated by removing the fourth liner on the photothermal conversion layer 120 and the first liner on the adhesive base film layer 130.

However, the manufacturing process of the adhesive film of the present disclosure is not limited thereto, and any method for forming the photothermal conversion layer 120, the adhesive base film layer 130 of the film type, the buffer layer 140, and the adhesive layer 140 in a layered structure can be used.

If a liquid adhesive material and a liquid photothermal conversion material are used between the substrate and the supporter, a process of forming a photothermal conversion layer by coating a photothermal conversion material on the supporter and curing, and a process of forming an adhesive layer by coating an adhesive material on the substrate to be processed, and curing are required, respectively. Thereafter, a process of bonding the adhesive layer and the photothermal conversion layer under vacuum is required. That is, if a liquid material is used, a coating time, a curing time, and a bonding time are required.

On the other hand, if the adhesive film of the film type according to the present disclosure is used, only the process of removing the respective liners and attaching the adhesive layer to the substrate, and attaching the photothermal conversion layer to the supporter is required. Accordingly, the present disclosure can noticeably save the time required to process, and can save a cost necessary for a coating process, a curing process, a vacuum process, etc.

Figure 2A:
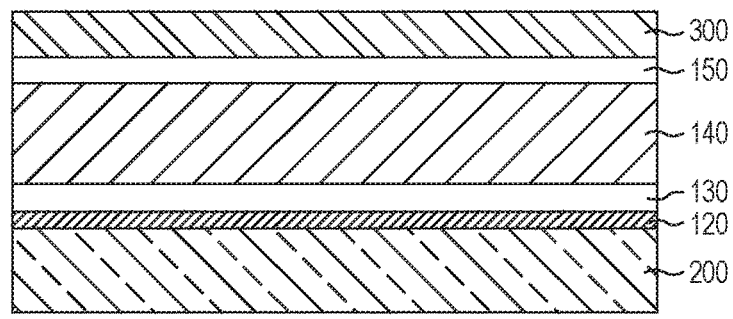
FIGS. 2A to 2C are views illustrating a process of processing a substrate which uses the adhesive film according to the present disclosure.
Figure 2B:
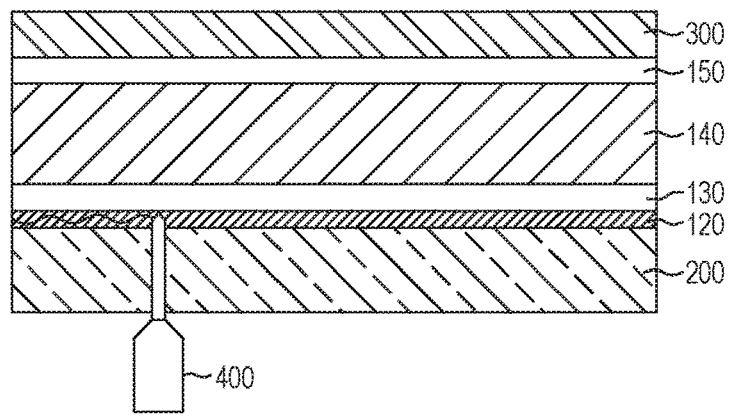
Figure 2C:
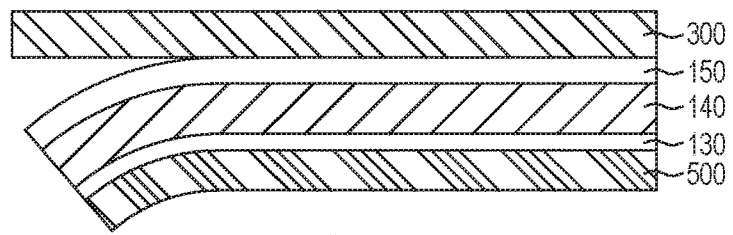

FIGS. 2A to 2C are views illustrating a process of processing a substrate which uses an adhesive film according to the present disclosure.

Referring to FIG. 2A, in the adhesive film according to the present disclosure, the photothermal conversion layer 120 is attached to a supporter 200, and the adhesive layer 150 is attached to a substrate 300. In this case, it is preferable that the process is performed at about 40° C. to about 80° C., so that stickiness between the phothothermal conversion layer 120 and the supporter 200 can increase.

The supporter 200 is a material that enables radiant energy such as a laser used in the present disclosure to pass therethrough, and this material is required to maintain the substrate 300 in a flat state and to prevent the substrate 300 from being destroyed during processing and conveyance. The supporter 200 is preferably hard and has a light transmitting property.

The light transmitting property of the supporter 200 is not limited as long as radiant energy is not prevented from transmitting into the photothermal conversion layer 120 to divide the photothermal conversion layer 120. However, it is preferable that transmissivity is, for example, about 50% or more.

In addition, it is preferable that the supporter 200 has high rigidity in order to prevent the substrate from being distorted during processing, and a bending strength of the supporter 200 is preferably greater than or equal to $2 \times 10^{-3} (Pa \cdot m^3)$, and more preferably, is greater than or equal to $3 \times 10^{-2} (Pa \cdot m^3)$.

In addition, it is preferable that the supporter 200 has a sufficient heat resisting property to prevent a damage caused by a thermal history that may occur when the process on the substrate is performed, and a heat deflection temperature of the supporter 200 is preferably higher than or equal to 550° C., and more preferably, is higher than or equal to 700° C.

The supporter 200 may be, for example, glass. When necessary, the supporter 200 may be surface-treated by a bonding agent, etc. to enhance an adhesion strength on an adjacent layer such as the photothermal conversion layer 120.

Thereafter, the substrate 300 and the supporter 200 are fixed with the adhesive film including the photothermal conversion layer 120, the adhesive base film layer 130, the buffer layer 140 and the adhesive layer 150 being placed therebetween, and then the substrate 300 is processed.

The substrate 300 is a substrate that is fixed to the supporter 200 and is processed, and then, is separated from the supporter 200, and may be, for example, a wafer or a substrate for a flexible display device.

For example, the substrate 300 may include a semiconductor wafer such as silicon and gallium arsenide, a crystal wafer, sapphire, or glass. A circuit surface of such a substrate 300 may be bonded with the adhesive layer 150. Thereafter, the substrate 300 may be processed into a thin film substrate by grinding a surface of the substrate 300 that is not bonded with the adhesive layer 150 through a grinder, etc.

In another example, the substrate 300 may be an epoxy mold wafer. A mold surface of such a substrate 300 may be bonded with the adhesive layer 150, and then, the substrate 300 may be processed into a completed substrate by performing a predetermined process for connecting a circuit on a surface of the substrate 300 that is not bonded with the adhesive layer 150.

In still another example, the substrate 300 may use a plastic or a metal thin film as a flexible substrate. For example, the substrate 300 may be PI. However, this should not be considered as limiting, and any material that has flexibility and can be used for a substrate for a flexible display device can be used.

For example, "processing" may include a process of forming an element layer on the substrate 300. Although not shown, the element layer may include a plurality of thin film layers and electric elements, and more specifically, may include a thin film transistor including a gate electrode, a semiconductor layer, a source electrode, and a drain electrode.

The flexible display device may be any one selected from the group consisting of an organic light emitting diode display device, a liquid crystal display device, and an electro-phoresis display device. However, this should not be considered as limiting, and the flexible display device may include all flexible display devices using flexible substrates.

Referring to FIG. 2B, after a desired process is performed, the supporter 200 and the processed substrate 300 are separated by projecting a laser 400. The laser 400 is projected from the supporter 200.

Radiant energy generated by the laser 400 is absorbed by the light absorbing agent of the photothermal conversion layer 120, and is converted into thermal energy. The generated thermal energy abruptly increases a temperature of the photothermal conversion layer 120, and the temperature causes decomposition of the pyrolytic resin in the photothermal conversion layer 120. A gas generated by thermal decomposition forms an opening layer in the photothermal conversion layer 120, and divides the photothermal conversion layer 120 into two portions, and accordingly, the supporter 200 and the processed substrate 300 are separated.

The pyrolytic resin in the photothermal conversion layer 120 is decomposed by projection of the laser 400, and forms a crack inside the layer to divide the photothermal conversion layer. Air (gas) generated by decomposition of the resin enters between the two layers and separates the two layers from each other. Accordingly, in order to promote the entry of air, it is preferable to project the laser 400 from a border portion of the photothermal conversion layer 120 toward the inside of the photothermal conversion layer 120.

A method of applying the laser 400 while reciprocating linearly from the border portion may be used to use the laser 400 from the border portion of the photothermal conversion layer 120, or alternatively, a method of projecting the laser 400 in a spiral pattern from the border portion toward the center like a phonograph may be used.

The laser 400 may be a laser having a wavelength generally ranging from about 300 to about 11,000 nm, preferably, from about 300 to about 2,000 nm, and a specific example thereof includes a YAG laser emitting light at a wavelength of 1,064 nm, a second harmonic wave generation YAG laser of a wavelength of 532 nm, and a semiconductor laser of a wavelength of 780 to 1,300 nm.

Referring to FIG. 2C, after the supporter 200 is removed, the adhesive base film layer 130, the buffer layer 140, and the adhesive layer 150 on the processed substrate 300 are removed. To remove the adhesive base film layer 130, the buffer layer 140, and the adhesive layer 150, a removal tape 500 which has stronger adhesion with respect to the adhesive base film layer 130 than adhesion between the processed substrate 200 and the adhesive layer 150 is preferably used.

Such a removal tape 500 may be disposed to be bonded to the adhesive base film layer 130, and afterward, may be detached along with the adhesive base film layer 130 and the adhesive layer 150, thereby removing the adhesive base film layer 130 and the adhesive layer 150 from the processed substrate 300.

Although not clearly illustrated in the drawing, a portion of the photothermal conversion layer 120 may remain on the adhesive base film layer 130 after the photothermal conversion layer 120 is divided. The remaining portion may also be removed when the removal tape 500 is used.

Although not shown in the drawing, a removal solution may be used to remove the adhesive base film layer 130, the buffer layer 140, and the adhesive layer 150 after the supporter 200 is removed. Preferably, the adhesive base film layer 130 on which a portion of the photothermal conversion layer 120 remains, the buffer layer 140, and the adhesive layer 150 may be removed by immersing them in the removal solution. Preferably, the adhesive layer 150 may be immersed in the removal solution for about 10 seconds to 60 seconds.

In addition, the removal solution may include trans-1,2-dichloroethylene and hydrofluoroether.

If a size or an area of the processed substrate 200 is large, it may be difficult to remove the adhesive base film layer 130 and the adhesive layer 150 at a time by using the removal tape 500. However, if the removal solution is used, it is easy to remove the adhesive base film layer 130 and the adhesive layer 150 of a large area. In addition, there are effects that an additional external physical force is not required and the adhesive base film layer 130 and the adhesive layer 150 can be removed within short time without residues.

The substrate processing method according to the present disclosure uses an already manufactured adhesive film, and thus is eco-friendly since a solvent is not required when the substrate is processed. In addition, when the already manufactured adhesive film is used, exposure of the supporter and the substrate to heat and UV can be reduced when the substrate is processed, and an additional damage can be prevented.

In addition, a process of directly coating an adhesive material or a photothermal conversion material on the supporter or the substrate, and curing is omitted, so that the process can be simplified and a processing cost and a time can be saved. Furthermore, the method is advantageous for forming uniform thicknesses of the adhesive layer and the photothermal conversion layer, and can be used in a process of processing a large-area substrate.

Hereinafter, the present disclosure will be described in more detail through experiment embodiments, but the experiment embodiments presented below are merely examples to exemplify the present disclosure, and are not intended to limit the present disclosure. That is, embodiments of the present disclosure can be changed in various forms, and the scope of the present disclosure should not be interpreted as being limited by the experiment embodiments presented below.

Manufacturing Example

Manufacturing Example 1-Manufacturing of a Photothermal Conversion Layer 4.97 g of a water-soluble dispersing agent (KD-6) was put into 500 g of a solvent (MEK). After the solution was agitated by an agitator at 10 RPM for 10 minutes, 33.33 g of carbon black and 12.67 g of $TiO_2$ were put, and the solution was agitated again at 10 RPM for 10 minutes. Next, 100 g of a binder resin was put and the solution was additionally agitated at 10-15 RPM for 20 minutes. Next, the carbon black and $TiO_2$ were dispersed by using a rotate mill (basket mill). The solution was agitated at 700-1300 RPM, but a zirconia bead of 0.8-1.2 mm was used. In this case, temperature was regulated not to exceed 30 degrees during dispersion by using a chiller.

The prepared solution was solvent-coated on a PET liner both sides of which were release-treated and which was 50 μm thick. Drying and curing were performed at 90° C. for 40 seconds, and a film thickness after drying reached 10 μm. The coated film was prepared by being wound in a roll type.

Manufacturing Example 2-Manufacturing of an Adhesive Base Film Layer 400 g of a solvent (MEK) was prepared. 54 g of an epoxy resin (cresol novalc epoxy resin) and 46 g of a phenol resin curing agent were put into the solvent. The solid epoxy resin and the phenol resin completely melted in the solution by using an agitator.

100 g of a solid elastomer binder resin was additionally put into the solution. The solution was sufficiently agitated at 30 RPM for 30 minutes by using an agitator, and an epoxy/elastomer mixture was formed. The used binder resin was configured with an elastomer of a molecular weight of 85 Mw which was epoxy-terminated.

0.2 g of imidazole was pulverized in a separate container as a curing catalyst, and then 10 g of a solvent (MEK/EA) was additionally put and was completely dissolved.

The dissolved imidazole solution was put into the prepared epoxy/elastomer mixture. The solution was agitated at low speed for 10 minutes by using an agitator.

The prepared solution was coated on a PET liner both sides of which were release-treated and which was 50 μm thick. Drying and curing were performed at 150° C. for 3 minutes, and a film thickness after drying reached 10 μm. The coated film was prepared by being wound in a roll type.

Manufacturing Example 3-Manufacturing of a Buffer Layer

A solvent (toluene/xylene) of 80% compared to a resin content was prepared. 98.04 parts by weight of a polysiloxane resin (a pure polysiloxane resin having a C═C double bond; SYL-OFF 7450), and 1.96 parts by weight of a curing agent (R—SiH having a catalyst) were put into the solvent, and the solution was agitated at 15 RMP for 30 minutes by using an agitator. Next, the mixture was left at a room temperature for 4 hours and was deaired.

Manufacturing Example 4-Manufacturing of a Silicon-Based Adhesive Layer

A solvent (toluene/xylene) of 80% compared to a resin content was prepared. 78.43 parts by weight of a silicon-based tackifier (an additive curing type resin of high cohesiveness; SG 6501 A), 19.61 parts by weight of a polysiloxane resin (a pure polysiloxane resin having a C═C double bond; SYL-OFF 7450), and 1.96 parts by weight of a curing agent (R—SiH having a catalyst) were put into the solvent, and the solution was agitated at 15 RMP for 30 minutes by using an agitator. Next, the mixture was left at a room temperature for 4 hours and was deaired.

Manufacturing Example 5-Manufacturing of a Second Silicon-Based Adhesive Layer

A solvent (toluene/xylene) of 80% compared to a resin content was prepared. 98.04 parts by weight of a silicon-based tackifier (an additive curing type resin of high cohesiveness; SG 6501 A), and 1.96 parts by weight of a curing agent (R—SiH in the presence of a catalyst) were put into the solvent, and the solution was agitated at 15 RMP for 30 minutes by using an agitator. Next, the mixture was left at a room temperature for 4 hours and was deaired.

EXAMPLE

An example having a structure as shown in table 1 presented below was manufactured.

TABLE 1

| | Example 1* | Example 2* | Example 3* | Example 4* | Example 5 |
|---|---|---|---|---|---|
| Structure | Acrylic adhesive layer | Buffer layer | Silicon-based adhesive layer | Silicon-based adhesive layer | Silicon-based adhesive layer |
| | Adhesive base film layer | Adhesive base film layer | Adhesive base film layer | Buffer layer | Buffer layer |
| | Photothermal conversion layer | Photothermal conversion layer | Photothermal conversion layer | Substrate Layer | Adhesive base film layer |
| | | | | Silicon-based adhesive layer | Photothermal conversion layer |
| | | | | Photothermal conversion layer | |

*does not indicate the present invention.

Example 1

An acrylic adhesive (ATT4025) was formed on the adhesive base film layer manufactured in manufacturing example 2 described above to have a thickness of 50 μm, and then was dried and cured at 150° C. for 3 minutes.

Thereafter, the photothermal conversion layer manufactured in manufacturing example 1, and the adhesive base film layer were laminated through a thermal lamination process. A temperature of a heating roll was 70° C. to 80° C. during the lamination, and lamination was performed through a typical roll-to-roll process, and a speed during the lamination was 3 m/minute.

Example 2

The buffer layer manufactured in manufacturing example 3 was formed on the adhesive base film layer manufactured in manufacturing example 2 described above to have a thickness of 80 μm, and then was dried and cured at 150° C. for 3 minutes. After being dried, the film was laminated with a fluorine release liner film of a thickness of 50 μm, and then, was wound in a roll type and stored. The prepared film was aged at 45° C. for 4 days.

Thereafter, the photothermal conversion layer manufactured in manufacturing example 1, and the adhesive base film layer were laminated through a thermal lamination process. A temperature of a heating roll was 70° C. to 80° C. during the lamination, and the lamination was performed through a typical roll-to-roll process, and a speed during the lamination was 3 m/minute.

Example 3

The silicon-based adhesive layer manufactured in manufacturing example 4 was formed on the adhesive base film layer manufactured in manufacturing example 2 described above to have a thickness of 80 μm, and then was dried and cured at 150° C. for 3 minutes. After being dried, the film was laminated with a fluorine release liner film of a thickness of 50 μm, and then, was wound in a roll type and stored. The prepared film was aged at 45° C. for 4 days.

Thereafter, the photothermal conversion layer manufactured in manufacturing example 1, and the adhesive base film layer were laminated through a thermal lamination process. A temperature of a heating roll was 70° C. to 80° C. during the lamination, and the lamination was performed through a typical roll-to-roll process, and a speed during the lamination was 3 m/minute.

Example 4

A silicone primer (7499/7387/4000) was applied onto a PI film, which is a base layer, and the buffer layer manufactured in manufacturing example 3 was formed to have a thickness of 70 μm, and then was dried and cured at 150° C. for 3 minutes. After being dried, the film was laminated with a fluorine release liner film of a thickness of 50 μm, and then, was wound in a roll type and stored. Thereafter, the silicon-based adhesive layer manufactured in manufacturing example 4 was formed to have a thickness of 10 μm, while the liner film was removed, and then, was dried and cured at 150° C. for 3 minutes. The prepared film was aged at 45° C. for 4 days.

The second silicon-based adhesive layer manufactured in manufacturing example 5 was formed on the other surface of the PI film to have a thickness of 30 μm, and then, was dried and cured at 150° C. for 3 minutes.

Thereafter, the photothermal conversion layer manufactured in manufacturing example 1, and the adhesive base film layer were laminated through a thermal lamination process. A temperature of a heating roll was 70° C. to 80° C. during the lamination, and the lamination was performed through a typical roll-to-roll process, and a speed during the lamination was 3 m/minute.

Example 5

The buffer layer manufactured in manufacturing example 3 was formed on the adhesive base film layer manufactured in manufacturing example 2 described above to have a thickness of 70 μm, and then was dried and cured at 150° C. for 3 minutes. After being dried, the film was laminated with a fluorine release liner film of a thickness of 50 μm, and then, was wound in a roll type and stored. Thereafter, the silicon-based adhesive layer manufactured in manufacturing example 4 was formed to have a thickness of 10 μm, while the liner film was removed, and then, was dried and cured at 150° C. for 3 minutes. The prepared film was aged at 45° C. for 4 days.

Thereafter, the photothermal conversion layer manufactured in manufacturing example 1, and the adhesive base film layer were laminated through a thermal lamination process. A temperature of a heating roll was 70° C. to 80° C. during the lamination, and the lamination was performed through a typical roll-to-roll process, and a speed during the lamination was 3 m/minute.

Experiment

Thermal Stability (Heat-Resisting Property) Test 1

The photothermal conversion layer of examples 1 to 5 was laminated on a glass supporter at 70° C., and the adhesive layer was vacuum-coupled with a mold wafer (temperature:50° C./vacuum:0.5 Torr/Time:30 seconds/force:50 kgf). To reduce a possibility that a void is generated, the coupled material was pressurized in an autoclave under the condition of a temperature of 70° C. and a pressure of 7 kgf for 5 minutes. The coupled material was put into an oven, and was heated up to 220° C. for an hour and a half by gradually increasing temperature along with a temperature increase (Ramp-up) process. An isothermal process proceeded for 2 hours after a target temperature was reached, and it was observed whether delamination occurred.

Thermal Stability (Heat-Resisting Property) Test 2

Examples 1 to 5 were placed between two sheets of glass and laminated. Thereafter, the film was placed on a hot plate of 180° C. for 30 minutes and a state was checked.

Substrate Protrusion Embeddability Test

The photothermal conversion layer was excluded from examples 1 to 5, and a removal tape (#3305) was laminated on the adhesive base film layer. The adhesive layer of examples 1 to 5 was laminated on a wafer having a protrusion which was heated at 70° C. When there did not exist the photothermal conversion layer, it was possible to check a state when the protrusion was shielded since the film was translucent.

Adhesive Peeling Force Test

The adhesive layer of examples 1 to 5 was laminated on a wafer having a protrusion, and a thermal aging process proceeded in an oven at 200° C. for one hour. After cooling the wafer at a room temperature after aging, a removal tape (#3305) was laminated on an upper portion. Thereafter, the adhesive layer was removed by peeling by using the removal tape at 70° C., and an adhesive peeling force was checked.
Residue Check Test After the adhesive layer was removed in the adhesive peeling force test, residues on the wafer were checked.

Results of experiments are shown in table 2 presented below.

Evaluation of the Silicon-Based Adhesive Layer

A solvent (toluene/xylene) of 80% compared to a resin content was prepared. Components of table 3 presented below was put into the solvent, and the solution was agitated at 15 RPM for 30 minutes by using an agitator. However, if BPO was applied, the BPO was put into the solvent first, and then, after the BPO was completely dissolved by low-speed agitating, other components were put and additional agitat-

TABLE 2

|  | Example 1* | Example 2* | Example 3* | Example 4* | Example 5 |
|---|---|---|---|---|---|
| Thermal stability 1 | Delamination Adhesive melted | Delamination | No problem | No problem | No problem |
| Thermal stability 2 | Void generated Delamination | Delamination | No problem | Void generated Delamination | No problem |
| Substrate protrusion embeddability | Void generated | No problem | No problem | Small Void generated | No problem |
| Adhesive peeling force | High | Low | High | Intermediate | Intermediate |
| Check of residue | Adhesive melted | No residue | No residue | No residue | No residue |

*does not indicate the present invention.

Example 1*                    Example 5

The acrylic adhesive was used in example 1*, and it was impossible to perform a high-temperature process due to a low heat-resisting property and cohesiveness, and delamination was identified. That is, although the acrylic adhesive was a curing type adhesive, there was a limit to thermal stability, and a damage was observed.

In addition, in the case of example 2* in which only the buffer layer having low adhesion or less adhesion was used, delamination was observed in a test accompanied by a high temperature. Accordingly, it was identified that it was impossible to apply the buffer layer solely.

In the case of example 3*, residues were not observed, but it was identified that there was a big problem in the peeling force of the adhesive. This may result in a problem in a process of processing a substrate to have a thin thickness like a wafer.

In the case of example 4*, it was identified that delamination and a void occurred during the process due to the influence of a base layer such as a hard PI film and an inner silicon-based adhesive layer. In addition, a small void was observed when the film was embedded in the protrusion at a low ratio.

On the other hand, in the case of example 5, a problem did not arise in a hot plate process due to the adhesive base film layer, and embeddability for the protrusion can be maximized by applying an additive curing type silicon-based adhesive which is a low modulus adhesive.

In particular, a buffer layer of low adhesion is applied and an adhesive layer of high adhesion is separately formed on an upper portion of the buffer layer to be thin, such that adhesion can be given to endure a high-temperature process, and also, the adhesive peeling force can be reduced during delamination.

ing was performed. Next, the mixture was left at a room temperature for 4 hours and was deaired.

The manufactured mixture was formed on the adhesive base film layer manufactured in manufacturing example 2 described above to have a thickness of 80 μm, and then was dried and cured at 150° C. for 3 minutes. After being dried, the film was laminated with a fluorine release liner film of a thickness of 50 μm, and then, was wound in a roll type and stored. The prepared film was aged at 45° C. for 4 days.

Thereafter, the photothermal conversion layer manufactured in manufacturing example 1, and the adhesive base film layer were laminated through a thermal lamination process. A temperature of a heating roll was 70° C. to 80° C. during the lamination, and the lamination was performed through a typical roll-to-roll process, and a speed during the lamination was 3 m/minute.

With respect to the adhesive film including the silicon-based adhesive layer manufactured as described above, the two thermal stability tests, the substrate protrusion embeddability test, the adhesive peeling force test, and the residue test were conducted in the same method described above, and a modulus was measured, and results therefrom are shown in table 4 presented below. To measure the modulus, an adhesive layer was coated on a fluorine liner, and then coating was performed to provide a film thickness of 50 μm after drying, and by doing these processes 20 times, a sample of a width of 20 nm, a thickness of 1 mm was manufactured, and a storage modulus was measured by using a DMA at both sides of a jig.

TABLE 3

| | MQ resin | Siloxane polymer having vinyl functionality | Silanol terminated PDMS | Dimethylsiloxane, methylhydride roxiloxic acid copolymer | Curing system (curing agent + cross-linker) | |
|---|---|---|---|---|---|---|
| Example 6 | 0 | 0 | 96.62 | 0 | Radical curing type | BPO 3.38 |
| Example 7 | 0 | 0 | 96.62 | 0 | Radical curing type | Dichloro BPO 3.38 |
| Example 8 | 0 | 0 | 98.04 | 0 | Radical curing type | BPO 1.96 |
| Example 9 | 0.41 | 9.93 | 86.96 | 0 | Radical curing type | BPO 2.70 |
| Example 10 | 0.40 | 9.89 | 86.61 | 0 | Radical curing type + Additive curing type | BPO 2.69 silane 0.40 |
| Example 11 | 56.86 | 43.14 | 0 | 0 | Additive curing type | Silane 1.96 |
| Example 12 | 44.17 | 42.76 | 11.09 | 0 | Additive curing type | Silane 1.96 |
| Example 13 | 45.88 | 42.55 | 9.61 | 0 | Additive curing type | Silane 1.96 |
| Example 14 | 1.96 | 48.04 | 48.04 | 0 | Additive curing type | Silane 1.96 |
| Example 15 | 1.96 | 72.55 | 0 | 23.53 | Additive curing type | Silane 1.96 |
| Example 16 | 9.21 | 69.13 | 0 | 20.67 | Additive curing type | No additive |

\* Each numerical value indicates part by weight.
\* Platinum catalyst was added in examples 10 to 16 (1 weight % with reference to a resin composition)

TABLE 4

| | Modulus | Thermal stability test 2 | Substrate protrusion embeddability test | Adhesive peeling force test | | Residue test | |
|---|---|---|---|---|---|---|---|
| | | | | Initial stage | Thermal aging | Glass | Wafer |
| Example 6 | 5~10 | No problem | Small void | 1950 | — | Residue | Residue |
| Example 7 | 5~10 | No problem | Small void | 1850 | — | Residue | Residue |
| Example 8 | 5~10 | No problem | Void | 2100 | — | Residue | Residue |
| Example 9 | — | Void | — | Not cured | — | Residue | Residue |
| Example 10 | 10 | No problem | No problem | 350 | — | Residue | Residue |
| Example 11 | 15 | Small void | Void | 1000 | 1980 | Silicon oil | No residue |
| Example 12 | 15~20 | No problem | No problem | 125 | 480 | No residue | No residue |
| Example 13 | 15~20 | No problem | No problem | 280 | 750 | No residue | No residue |
| Example 14 | 20~25 | Delamination | No problem | 5 | 10 | No residue | No residue |
| Example 15 | 35~40 | Delamination | — | 5 | 10 | No residue | No residue |
| Example 16 | 5~10 | No problem | Void | 10 | 25 | Silicon oil | Silicon oil |

Although embodiments of the present disclosure have been described, they are merely examples, and it will be understood by a person skilled in the art that various changes can be made there from and other equivalent embodiments are possible. Therefore, the scope of the present disclosure should be construed as including not only the claims presented below but also an equivalent scope thereto.

DESCRIPTION OF REFERENCE NUMERALS

120: photothermal conversion layer; 130: adhesive base film layer; 140: buffer layer; 150: adhesive layer 200: supporter; 300: substrate; 400: laser; 500: removal tape

What is claimed is:

1. An adhesive film comprising:
   a photothermal conversion layer comprising a light absorbing agent and a pyrolytic resin;
   an adhesive base film layer disposed on the photothermal conversion layer;
   a buffer layer disposed on the adhesive base film layer; and
   an adhesive layer disposed on the buffer layer,
   wherein the buffer layer comprises a polysiloxane resin,
   wherein the adhesive layer comprises a silicon-based adhesive, and the silicon-based adhesive comprises a silicon-based tackifier and a polysiloxane resin.

2. The adhesive film of claim 1,
   wherein the silicon-based adhesive comprises an additive curing silicon-based resin.

3. The adhesive film of claim 1,
   wherein the silicon-based tackifier comprises an MQ resin.

4. The adhesive film of claim 1,
wherein the silicon-based adhesive has a modulus of 10 MPa to 25 MPa at a room temperature after being cured.

5. The adhesive film of claim 1,
wherein the adhesive layer has a thickness of 5 μm to 10 μm.

6. The adhesive film of claim 1,
wherein the polysiloxane resin of the buffer layer comprises an additive curing resin.

7. The adhesive film of claim 1,
wherein the polysiloxane resin of the buffer layer comprises a siloxane resin having a C=C double bond.

8. The adhesive film of claim 1,
wherein the buffer layer does not comprise an MQ resin or comprises an MQ resin by less than 5 weight %.

9. The adhesive film of claim 1,
wherein a thickness of the buffer layer is greater than or equal to 50 μm.

10. The adhesive film of claim 1,
wherein the buffer layer has a modulus of 10 MPa to 25 MPa at a room temperature after being cured.

11. The adhesive film of claim 1,
wherein the pyrolytic resin has a —COOH or —OH functional group, and comprises two kinds of acrylic resins having different weight average molecular weights.

12. The adhesive film of claim 1,
wherein the adhesive base film layer has an adhesion with respect to both the buffer layer and the photothermal conversion layer.

13. The adhesive film of claim 1,
wherein the adhesive base film layer comprises a multi-functional epoxy resin, a binder resin, a curing agent, and a curing catalyst.

* * * * *